United States Patent
Popp et al.

(10) Patent No.: US 9,383,012 B2
(45) Date of Patent: Jul. 5, 2016

(54) DEVICE FOR ACTUATING A LOCKING MECHANISM

(71) Applicant: ZF Friedrichshafen AG, Friedrichshafen (DE)

(72) Inventors: Christian Popp, Kressbronn (DE); Stefan Meschenmoser, Friedrichshafen (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/009,575

(22) PCT Filed: May 2, 2013

(86) PCT No.: PCT/EP2013/059125
§ 371 (c)(1),
(2) Date: Oct. 3, 2013

(87) PCT Pub. No.: WO2013/189655
PCT Pub. Date: Dec. 27, 2013

(65) Prior Publication Data
US 2015/0159752 A1    Jun. 11, 2015

(30) Foreign Application Priority Data

Jun. 22, 2012  (DE) .......................... 10 2012 210 571

(51) Int. Cl.
*F16H 63/34*    (2006.01)
*F16H 63/38*    (2006.01)

(52) U.S. Cl.
CPC ............ *F16H 63/3458* (2013.01); *F16H 63/34* (2013.01); *F16H 63/3416* (2013.01); *F16H 63/3483* (2013.01); *F16H 63/3475* (2013.01)

(58) Field of Classification Search
CPC ............ F16H 63/3458; F16H 63/3483; F16H 63/3416; F16H 63/3425; F16H 63/3433; F16H 63/3491; F16H 3/3475
USPC ......................................... 192/219.6; 335/280
See application file for complete search history.

(56) References Cited

U.S. PATENT DOCUMENTS 3,251,278 A * 5/1966 Royster ............................. 92/18
5,048,656 A * 9/1991 Braun ......................... 192/85.57
(Continued)

FOREIGN PATENT DOCUMENTS

DE    198 34 156 A1    2/2000
DE    100 37 565 A1    4/2002
(Continued)

OTHER PUBLICATIONS

German Office Action Corresponding to 10 2012 210 571.9 mailed Feb. 28, 2013.

(Continued)

*Primary Examiner* — Robert Hodge
*Assistant Examiner* — Ryan Dodd
(74) *Attorney, Agent, or Firm* — Davis & Bujold, PLLC; Michael J. Bujold

(57) ABSTRACT

A device for actuating a locking mechanism, in particular for actuating a parking lock of a vehicle having an automatic transmission. The device comprises a piston which axially moves, a retaining device which is self-activating when the piston is in an axial position in which the locking mechanism is open to hold the piston in the axial position in which the locking mechanism is open, and an actuating device for actuating a release element, which deactivates the retaining device. To hold the piston in an axial position in which the locking mechanism is closed, the retaining device is self-activating, and can be deactivated to enable the piston to move, starting from the axial position in which the locking mechanism is closed, to the axial position in which the locking mechanism is open.

14 Claims, 1 Drawing Sheet

(56) References Cited

U.S. PATENT DOCUMENTS

| | | |
|---|---|---|
| 6,471,027 B1 | 10/2002 | Gierer et al. |
| 6,823,976 B2 | 11/2004 | Schmid |
| 7,861,839 B2 | 1/2011 | Schweiher et al. |
| 2004/0011609 A1* | 1/2004 | Schmid .................. 188/265 |
| 2011/0023647 A1 | 2/2011 | Engel et al. |
| 2015/0008092 A1* | 1/2015 | Mang et al. ............. 192/219.4 |
| 2015/0167843 A1* | 6/2015 | Schuller .................. 192/219.4 |

FOREIGN PATENT DOCUMENTS

| | | |
|---|---|---|
| DE | 102 45 386 A1 | 4/2004 |
| DE | 10 2006 022 963 A1 | 11/2007 |
| DE | 10 2008 011 898 A1 | 9/2009 |
| EP | 1 855 033 A2 | 11/2007 |
| JP | 2008-128444 A | 6/2008 |

OTHER PUBLICATIONS

Form PCT/ISA/206 Corresponding to PCT/EP2013/059125 mailed Jun. 25, 2013.

\* cited by examiner

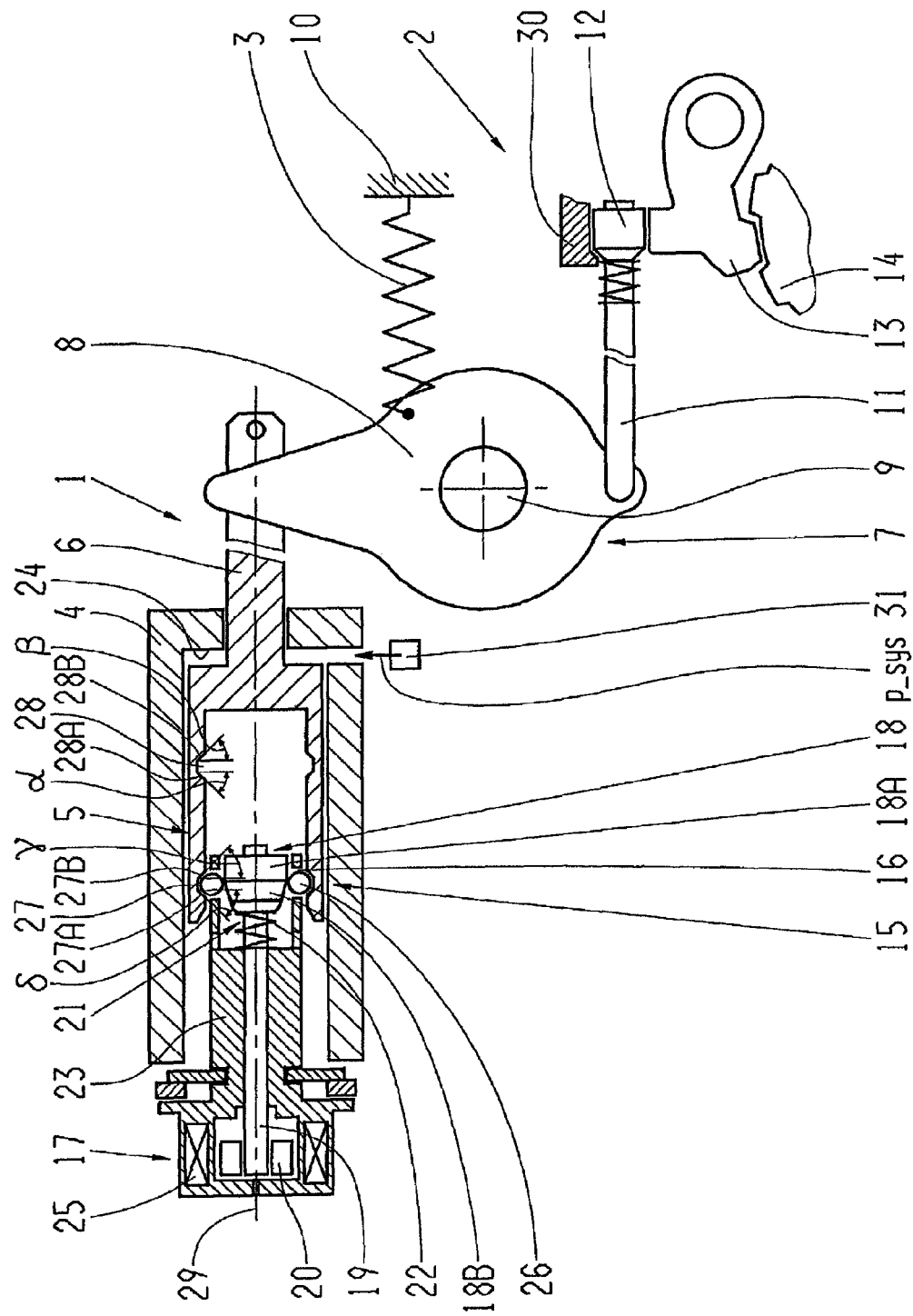

DEVICE FOR ACTUATING A LOCKING MECHANISM

This application is a National Stage completion for PCT/EP2013/059125 filed May 2, 2013, which claims priority from German patent application serial no. 10 2012 210 571.9 filed Jun. 22, 2012.

FIELD OF THE INVENTION

The invention concerns a device for actuating a locking mechanism.

BACKGROUND OF THE INVENTION

A parking lock actuating device and a driving gear selector device for an automatic transmission of a motor vehicle are known from DE 102 45 386 A1. The parking lock actuating device is made with a parking lock cone by means of which the parking lock can be engaged and disengaged. In one of the embodiments of the parking lock actuating device shown, one end of the parking lock cone is connected to a lever mounted to swivel on a bearing. When the lever is swiveled about the bearing the parking lock is displaced in the axial direction. The lever is connected by a rod to an actuating piston or piston unit, which is arranged to move axially in a cylinder. Between the actuating piston and an end of the cylinder facing toward the bearing is arranged an engagement energy storage device in the form of a spring, or parking lock engaging spring. The parking lock engaging spring exerts a force on the actuating piston, which force is directed away from the bearing.

In addition the parking lock actuating device comprises a release device. For this, a release piston is also arranged in the cylinder. Between an end of the cylinder opposite the end facing the bearing and the release piston is arranged a locking release energy storage device in the form of a parking lock release spring. The parking lock release spring exerts a force on the release piston in the direction of the bearing and pushes the release piston in opposition to a retaining device in the form of a lifting magnet which comprises an electromagnetically actuated retaining pin.

A pressure chamber formed by the release piston and the cylinder is connected by a pressure line to a hydraulic system of the automatic transmission. A parking lock pressure is present in the pressure chamber. By means of a valve the connection to a pump powered by a drive engine of the motor vehicle can be formed or interrupted. If the connection is formed and the working pressure produced by the pump is high enough, then a force acts on the actuating piston in the direction of the bearing, which moves the actuating piston in opposition to the force of the parking lock engaging spring, toward the bearing. The lever then swivels counter-clockwise and the parking lock is disengaged.

If the parking lock pressure falls below a limit value, the force exerted by the parking lock engaging spring on the actuating piston is larger than the force acting in the opposite direction. Thus, the actuating piston moves away from the bearing so the lever swivels clockwise. The parking lock is thereby engaged. The parking lock pressure can be reduced to below the limit value by interrupting the connection between the pressure chamber and the hydraulic system and at the same time connecting the pressure chamber to a tank (not shown). In addition the parking lock pressure can be reduced by reducing the working pressure, for example by switching off the drive engine. Thus, it is not possible to disengage the parking lock without the release device if the working pressure is no longer high enough.

If the parking lock has to be disengaged when the working pressure is insufficient, the lifting magnet is actuated by the control unit in such manner that the retention of the release piston is released and the release piston is moved by the parking lock release spring in the direction toward the bearing. The size of the parking lock release spring is chosen such that the release piston moves, encounters the actuating piston, and carries the latter along with it. Thus the lever swivels counter-clockwise and the parking lock is released.

If the parking lock pressure is increased again, the release piston is moved in opposition to the force of the parking lock release spring to the initial position shown, and is held there by means of the lifting magnet or its retaining pin. The release device is then ready to be operated again. At the same time the actuating piston is moved in opposition to the force of the parking lock engagement spring in the direction toward the bearing and the parking lock is therefore released. Thus, the energy level of the engagement energy storage device in the form of the parking lock engagement spring is increased by means of the parking lock pressure.

In the above-described embodiment of the parking lock actuating device, the parking lock can be released by virtue of a corresponding actuating pressure. Below the necessary release pressure level, the parking lock can also be released by means of a storage spring, which is usually locked by an electromagnetic blocking magnet when de-energized, by appropriately energizing the locking magnet.

Disadvantageously, below the necessary pressure level, after being released by the spring the parking lock can no longer be engaged, since a corresponding pressure level is required for that. This means that the parking lock, which has been changed to its open operating condition by the spring, can only be engaged again by acting upon it appropriately with hydraulic pressure. If a corresponding functional defect occurs in the area of the hydraulic system or in the area of the electrical system that supplies current to the mechanical locking magnet, the parking lock is released or even not engaged to begin with, which in some circumstances, however, can give rise to safety-critical operating conditions of a vehicle made with the parking lock system.

SUMMARY OF THE INVENTION

Accordingly, the purpose of the present invention is to provide a device for actuating a locking mechanism, by means of which safety-critical operating conditions can be avoided if a fault occurs.

The first device according to the invention for actuating a locking mechanism and in particular for actuating a parking lock device of a vehicle drive-train of a vehicle made with an automatic transmission, comprises at least one piston unit that is spring-loaded in the closing direction of the locking mechanism that can be actuated hydraulically in the opening direction of the locking mechanism, a retaining device (15) for holding the piston unit in a defined position, and an actuating device with an electromagnet for actuating a release element which is provided for deactivating the retaining device and which is acted upon by means of a displacing device with a control force that acts in the direction of a position equivalent to the deactivated operating condition of the retaining device.

According to the invention, in this case the retaining device has two locking devices both of which can be deactivated by the release element. In its activated condition the first locking device holds the piston unit in a position equivalent to the closed condition of the locking mechanism. This serves to guard against displacement of the locking mechanism starting from its closed condition toward the opening direction as a result of a fault in the hydraulic control of the piston unit. In its activated condition the second locking device holds the piston unit in a position equivalent to the open condition of the locking mechanism when, after reaching its position equivalent to the open condition of the locking mechanism, the piston is not acted upon by pressure.

Both of the locking devices can be in the form of mechanical locking devices. It can be provided that the retaining device for holding the piston unit in a position equivalent to a closed condition of the locking mechanism is made self-activating and can be deactivated in order to enable movement of the piston unit starting from the position equivalent to the closed condition of the locking mechanism in the direction toward the position equivalent to the open condition of the locking mechanism.

In the second device according to the invention for actuating a locking mechanism, in particular for actuating a parking lock device of a drive-train of a vehicle made with an automatic transmission, at least one piston unit is provided which is spring-loaded in the closing direction of the locking mechanism and can be actuated hydraulically in the opening direction of the locking mechanism and which is arranged to move in the axial direction, a self-activating retaining device for holding the piston unit in an axial position equivalent to an open condition of the locking mechanism, and an actuating device with an electromagnet for actuating a release element, which is provided for deactivating the retaining device and which is acted upon by a displacing device with a control force in the direction of a position equivalent to the deactivated operating condition of the retaining device.

According to the invention, in this case the retaining device for holding the piston unit in an axial position equivalent to a closed condition of the locking mechanism is designed to be self-activating, and it can be deactivated in order to enable a movement of the piston unit starting from the axial position equivalent to the closed condition of the locking mechanism in the direction toward the axial position equivalent to the open condition of the locking mechanism.

By means of both devices according to the invention an erroneous release of the locking mechanism or a change of the locking mechanism to an open operating condition when the electromagnet is energized due to erroneous action upon the piston unit with an actuating pressure that acts in the direction of an axial position equivalent to the open condition of the locking mechanism is avoided in a simple manner, so that safety-critical operating conditions of a vehicle incorporating the device do not occur in the event of a fault.

This is particularly advantageous in the case of a so-termed remote-start of a vehicle made with an electric switching concept known as such. In the present context a remote-start of a vehicle is understood to mean the starting of the vehicle's drive engine by remote action without a driver being present in the vehicle. Such a remote-start can be carried out for example by a servicing operator in order to allow a vehicle to warm up or to cool its inside space by means of an air-conditioning unit.

If the device is integrated in a parking lock system of a vehicle with electrical switching, the device is made with an additional safety mechanism in order to prevent the release of the parking lock in the event of a fault, i.e. if the hydraulic pressurization of the piston unit is erroneous.

In a simply designed embodiment of the device according to the invention, the retaining device can again be deactivated by the release element in order to permit the piston unit to move starting from its axial position equivalent to the closed condition of the locking mechanism in the direction toward the axial position equivalent to the open condition of the locking mechanism.

If the release element is functionally connected to an armature element associated with the electromagnet, the release element can be arranged a distance away from the electromagnet but can nevertheless be actuated by the electromagnet with little design complexity.

In an advantageous further development of the device according to the invention, the release element and the armature element are functionally connected to one another in a simply designed manner by way of an armature rod.

If the retaining device is formed with at least one blocking element functionally connected to the piston unit in the axial position of the piston unit that is equivalent to the open condition of the locking mechanism, by means of which blocking element the piston unit can be held in the position equivalent to the open or closed condition of the locking mechanism when the retaining device is in its activated operating condition, then the piston unit is in each case held in the desired position in an interlocked manner which can be realized with little production complexity.

In an embodiment of the device according to the invention that can also be produced simply and inexpensively, the at least one blocking element for activating the retaining element can be guided by the release element into recesses of the piston unit or an area functionally connected thereto.

An also simply designed and inexpensive embodiment of the device according to the invention is characterized in that the at least one blocking element, in the condition thereof in which it is holding the piston unit in the axial position equivalent to the open condition of the locking mechanism, engages in a first recess while in its condition in which it is holding the piston unit in the axial position equivalent to the closed condition of the locking mechanism, it engages in a second recess.

If surfaces of the release element and of the first recess that co-operate with the blocking element are matched with one another in such manner that when the electromagnet is in its energized operating condition the blocking element can be held by the release element in the first recess, whereas when the electromagnet is not energized the blocking element can be moved by the spring force acting on the piston unit out of the first recess, then in a simple manner this ensures that the retaining device acted upon by the spring force on the piston unit can be kept in its activated operating condition by a small electromagnetic holding force, whereas when the electromagnet is not energized the retaining device changes to its deactivated operating condition in order to change the locking mechanism to the open operating condition and to be able to engage a parking lock device.

If surfaces of the release element and of the second recess that co-operate with the blocking element are matched to one another in such manner that when the electromagnet is energized the blocking element can be held by the release element in the second recess, whereas when the electromagnet is not energized the blocking element can be moved by a hydraulic force acting on the piston unit out of the second recess, this ensures that the release element can be actuated by means of the electromagnet without any action by an external force and in the event that the piston unit is erroneously acted upon by the hydraulic pressure, the axial force that results from this hydraulic pressure and acts upon the piston unit does not deactivate the retaining device, so that undesired opening of the locking mechanism and release of the parking lock device are avoided.

The features indicated in the example embodiment of the device according to the invention described below are in each case, whether considered alone or in any desired combination with one another, suitable as further developments of the object of the invention. In relation to such further development of the object according to the invention, the respective combinations of features have no restrictive force but are essentially presented only as examples.

BRIEF DESCRIPTION OF THE DRAWINGS

Further advantages and advantageous further developments of the device according to the invention emerge from the example embodiment whose principle is described below with reference to a sole drawing.

The sole FIGURE in the drawing shows a very schematic partial representation of a device for actuating a locking mechanism designed as a parking lock device.

DETAILED DESCRIPTION OF THE PREFERRED EMBODIMENTS

The FIGURE shows a schematic partial longitudinal section of a device 1 for actuating a locking mechanism 2 in this case designed as a parking lock device. In a manner known per se, the device 1 comprises a piston unit 5 arranged to move in the axial direction in a cylinder 4, which piston can be acted upon by a fluid and depending on the fluid pressure can be actuated in the opening direction of the locking mechanism 2 in opposition to a spring device 3 that acts in the closing direction of the locking mechanism 2, which is connected by a drive-pin 6 to a guide mechanism 7. In this case the guide mechanism 7 comprises a rotary plate 8 which is mounted to rotate in the area of a bolt 9. In this case the spring device 3 is in the form of a tension spring connected at one end to the rotary plate 8 and supported at the other end in the area of a housing 10. In addition the rotary plate 8 is functionally connected to a parking lock rod 11 which is coupled to a parking lock cone 12. The parking lock cone 12 co-operates with a parking lock pawl 13. By means of an axial movement of the piston unit 5, the parking lock pawl 13 can be brought into engagement with a parking lock wheel 14 connected in a rotationally fixed manner to a drive output of a drive-train, in order to fix the drive output rotationally. If the parking lock pawl 13 is moved out of engagement with the parking lock wheel 14 by an opposite axial movement of the piston unit 5, the parking lock device is released and the drive output can rotate.

Furthermore the device 1 is made with a retaining device 15 which is self-activating in an axial position of the piston unit 5 equivalent to an open condition of the locking mechanism 2 in order to hold the piston unit 5 in the axial position equivalent to the open condition of the locking mechanism 2. Moreover the retaining device 15 also activates itself in an axial position of the piston unit 5 equivalent to a closed condition of the locking mechanism 2 in order to be able to hold the piston unit 5 in the axial position equivalent to the closed condition of the locking mechanism 2.

The device 1 also comprises an electromagnetic actuating device 17 for actuating a release element 18, by means of which the retaining device 15 can be deactivated in the manner described later. In this case the release element 18 is connected to an armature rod 19 and is arranged to move longitudinally inside the cylinder 4 together with the armature rod 19 and an armature element 20 in turn functionally connected thereto. The release element 18, the armature rod 19 and the armature element 20 are acted upon by means of a displacement device 21 with a control force that acts in the direction of a position equivalent to the deactivated operating condition of the retaining device 15. For this, the displacement device 21 comprises a spring device 22 which is positioned between a component 23 fixed on the housing and the release element 18, and which is slid onto the armature rod 19.

When the parking lock device is open and the retaining device 15 is activated at the same time, the spring force of the spring device 3 acts on the piston unit 5, the spring 3 acting on the piston unit 5 in opposition to the holding force of the retaining device 15 as in the axial position illustrated in the FIGURE. As a difference from this the spring device 3 can also be made as a compression spring in order to act upon the piston unit 5 with a control force directed away from the electromagnetic actuating device 17.

In the present case, when the parking lock device is to be released, the piston unit 5 is supplied by way of a so-termed parking lock valve 31 with a system pressure p_sys of a hydraulic system of an automatic transmission.

In the normal operating mode, during which the piston unit 5 can be acted upon in the area of a functional surface 24 with a fluid pressure and the electromagnetic actuating device 17 can be energized, the device 1 shown in the FIGURE operates as follows:

In the operating condition of the device 1 shown in the FIGURE, in which the release element 18, the armature rod 19 and the armature element 20 are held by an energized electromagnet 25 of the electromagnetic actuating device 17 in their axial position equivalent to an activated operating condition of the retaining device 15 in opposition to the spring force of the spring device 22, the piston unit 5 is in an axial position equivalent to a closed condition of the locking mechanism 2 or to an engaged operating condition of the parking lock device. The retaining device 15 is activated and holds the piston unit 5 in the axial position shown. An autonomous release of the parking lock device if the fluid pressure acting on the piston unit 5 in the area of the functional surface 24 is erroneous, is reliably avoided by the activated retaining device 15. The electromagnet 25 can either be screwed axially onto the component 23 fixed to the housing, or it can be fixed in the axial direction by a plate, in order to be able to be supported by the housing against the axial tension and compression forces that act during operation of the device 1.

If by virtue of a driver's wish specification the parking lock device has to be released, this wish preferably being indicated by way of a drive gear selector device, the energization of the electromagnet 25 of the electromagnetic actuating device 17 is interrupted. As a result the magnetic force acting on the armature element 20 falls toward zero and, because of the decreasing magnetic force of the electromagnet 25, the release element 18 is moved by the spring force of the spring device 22 of the displacement device 21 away from the axial position shown in the FIGURE toward the drive-pin 6.

In the present case the release element 18 is formed with a cylindrical section 18A with an essentially constant diameter which is extended farther in the axial direction, on the side facing toward the electromagnetic actuating device 17, by a truncated-cone-shaped section 18A whose maximum diameter corresponds essentially to the diameter of the cylindrical section 18B and whose diameter decreases continuously toward the electromagnetic actuating device 17 down to a minimum.

Against the release element 18 rest a plurality of spherical blocking elements 26 distributed around the circumference of the release element 18, which are held in the axial direction in radial bores 16 formed in the component 23 fixed to the housing and which, depending on the axial position of the release element 18, can be moved radially in the radial bores 16. In the axial position of the release element 18 shown in the FIGURE the blocking elements 26 rest against the release element 18 essentially at the diameter level of the cylindrical section 18A and are pressed radially outward through the radial bores 16 of the component 23 fixed to the housing into a first recess 27 formed in the piston unit 5. In this case the first recess 27 is in the form of an annular groove and is delimited in the axial direction by two surfaces 27A and 27B. Relative to a radial plane perpendicular to the symmetry axis 29 of the device 1, the surfaces 27A and 27B are respectively tilted or inclined by a blocking angle δ or γ, respectively, in order to ensure the mode of operation of the device 1 described later during an activated operating condition of the retaining device 15 and to be able to change the retaining device 15 to the desired extent from its activated operating condition to a deactivated operating condition.

If, following a demand to release the parking lock device, energy to the electromagnet 25 is discontinued and the release element 18 is therefore moved by the spring device 22 in the manner described earlier in the direction toward the drive-pin 6, the blocking elements 26 are no longer held by the release element 18 in the radial position shown in the FIGURE. As the axial control movement of the release element 18 increases the blocking elements 26 rest against the release element 18 against the truncated cone section 18B thereof and, owing to its continually reducing diameter compared with the cylindrical section 18A, they slide radially inward until they are no longer engaged with interlock in the first recess 27.

If now the piston unit 5 is acted upon by a corresponding pressure in the area of the functional surface 24 with a hydraulic force directed toward the electromagnetic actuating device 17, then when the retaining device 15 is deactivated the piston unit is pushed toward the electromagnetic actuating device 17 and moves the blocking elements 26 farther radially inward out of the first recess 27 if they are still engaged at least partially in the first recess 27. This axial movement of the piston unit 5 causes the rotary plate 8 to pivot around the bolt 9 in opposition to the spring device 3 made as a tension spring. In turn, the pivoting movement of the rotary plate 8 causes the parking lock rod 11 connected to the rotary plate 8 also to be moved substantially in the axial direction so that the parking lock cone 12 moves away from its axial position shown in the FIGURE, between a component 30 fixed to the housing and the parking lock pawl 13. This enables the parking lock pawl 13, which is spring-loaded by a torsion spring in the direction toward the component 30 fixed to the housing, to move out of engagement with the parking lock wheel 14 and the parking lock device is thus released or the locking mechanism is opened.

In order to be able to hold the piston unit 5 in the axial position equivalent to the open operating condition of the locking mechanism 2 or parking lock device against the spring force of the spring device 3 even in the event that the actuating pressure applied on the functional surface 24 of the piston unit 5 falls, the electromagnet 25 of the electromagnetic actuating device 17 is energized in order to move the release element 18 in opposition to the spring force of the spring device 22 of the displacement device 21 to the axial position shown in the FIGURE. In the axial position of the piston unit 5 equivalent to the open operating condition of the locking mechanism 2 there is a further recess 28 of the piston unit 5 aligned with the radial bores 16 of the component 23 fixed to the housing, so that when the electromagnet 25 is energized the blocking elements 26 can be pushed by the release element 18 radially outward to engage with interlock in the second recess 28.

The second recess 28 is also delimited by two surfaces 28A and 28B in the axial direction of the piston unit 5. The surfaces 28A and 28B, relative to a radial plane perpendicular to the symmetry axis 29, make respective blocking angles α and β. This ensures that an activated operating condition of the retaining device 15 is maintained to the desired extent and in the event of a corresponding demand to deactivate the retaining device 15, the deactivation can be effected without sticking of the blocking elements 26 in the area of the second recess 28, as is the case with the co-operation of the blocking elements 26 with the first recess 27.

The device 1 has a locking function by virtue of which, when no pressure is acting on the piston unit 5, the parking lock device can be kept in its released operating condition. In the present case the locking function is realized by the electromechanically actuated ball retention mechanism described above. As a difference from this, it is also possible to realize the locking function of the device by means of a retaining hook mechanism or the like.

To obtain the locking function, in the area of the recesses 27 and 28 the piston unit 5 has, by virtue of the shape of the inclined surfaces 27A and 27B or 28A and 28B respectively, an appropriate locking geometry which is effective both when the parking lock device is engaged and when it is released. When the electromagnet 25 is appropriately energized, an undesired change of the parking lock device out of the engaged operating condition to the released operating condition in the event of erroneous action of hydraulic pressure upon the piston unit 5 in the area of the functional surface 24 is mechanically prevented by the interlock existing in the area of the retaining device 15 between the blocking elements 26 and the piston unit 5 in the area of the first recess 27.

The groove geometry or blocking angles α and β in the area of the second recess 28 and the blocking angles δ and γ in the area of the first recess 27, and the design of the control surfaces of the release element 18 in the area of its cylindrical section 18A and truncated-cone-shaped section 18B, are geometrically adapted to suit different requirements in the engaged and released operating conditions of the parking lock device. In the area of the second recess 28 and in the area of the release element 18, the retaining device 15 is designed in such manner that the electromagnet 25 can hold the armature element 20, the armature rod 19 and the release element 18 in the manner shown in the FIGURE, against the spring force of the spring device 22, even with a low actuating current, while if the energizing current is interrupted the retaining device 15 is moved by axial displacement of the release element 18 under the action of the spring device 22 so that the interlock formed between the component 23 fixed to the housing and the piston unit 5 by the blocking elements 26 is reliably released and the retaining device 15 is deactivated to the desired extent, in order to be able to engage the parking lock device.

If the parking lock device is closed and this closed operating condition has to be reliably maintained, then by virtue of the locking geometry of the retaining device 15 in the area of the first recess 27, by appropriate design of the blocking angles δ and γ in combination with the design of the release element 18 it must be ensured that by appropriately energizing the electromagnet 25 the release element 18 can be kept in the axial position shown in the FIGURE by means of the electromagnet 25 without any action by external force. The spring force of the spring device 3 or parking lock arm spring is absorbed by the housing 10, which can be a housing of a hydraulic control unit or of a transmission. If the piston unit 5 is acted upon erroneously in the area of the functional surface 24 by an actuating pressure which would tend to displace the piston unit 5 away from the axial position shown in the FIGURE in the direction toward the electromagnetic actuating device 17 in opposition to the spring force of the spring device 3, then the interlock formed between the component 23 fixed to the housing and the piston unit 5 by virtue of the blocking elements 26 when the electromagnet 25 is correspondingly energized should not be removed, in order to reliably avoid releasing the parking lock device if the piston unit 5 has been erroneously pressurized.

INDEXES

1 Device
2 Locking mechanism
3 Spring device
4 Cylinder
5 Piston unit
6 Drive-pin
7 Guide mechanism
8 Rotary plate
9 Bolt
10 Housing
11 Parking lock rod
12 Parking lock cone
13 Parking lock pawl
14 Parking lock wheel
15 Retaining device
16 Radial bore in the component 23 fixed on the housing
17 Electromagnetic actuating device
18 Release element
18A Cylindrical section of the release element
18B Truncated cone shaped section of the release element
19 Armature rod
20 Armature element
21 Displacement device
22 Spring device of the displacement device
23 Component fixed on the housing
24 Functional surface of the piston unit
25 Electromagnet of the electromagnetic actuating device
26 Spherical blocking element
27 First recess, first locking device
27A, 27B Surface of the first recess
28 Second recess, second locking device
28A, 28B Surface of the second recess
29 Line of symmetry
30 Component fixed on the housing
31 Parking lock valve
p_sys System pressure
$\alpha, \beta$ Blocking angle of the second recess
$\delta, \gamma$ Blocking angle of the first recess

The invention claimed is:

1. An automatic transmission vehicle drive-train locking mechanism actuating device (1), the locking mechanism actuating device comprising:
   a piston unit (5) spring-loaded in a closing direction of the locking mechanism (2) and hydraulically actuatable in an opening direction of the locking mechanism (2),
   a retaining device (15) for holding the piston unit (5) in a defined position,
   an actuating device (17), comprising an electromagnet (25) and an armature rod (19), for actuating a release element (18) provided for deactivating the retaining device (15),
   the release element (18) being additionally acted upon by a displacement device (21) with a control force that acts in a direction of a position equivalent to a deactivated operating condition of the retaining device (15),
   the retaining device (15) comprising first and second locking devices (27, 28), both of which are deactivatable by the release element (18), and the first and the second locking devices (27, 28) being separated and spaced apart from one another,
   the first locking device (27), in an activated condition, holding the piston unit (5) in a first position equivalent to a closed condition of the locking mechanism (2) to guard against displacement of the locking mechanism (2), starting from the closed condition toward the opening direction, as a result of faulty control of the piston unit (5),
   the second locking device (28), in an activated condition, holding the piston in a second position equivalent to the open condition of the locking mechanism (2), when after reaching a position equivalent to an open condition of the locking mechanism (2), the piston unit (5) is unpressurized, and
   the armature rod (19) and the piston unit (5) moving relative to one another as the piston unit (5) moves from the first position to the second position and vice versa.

2. The locking mechanism actuating device according to claim 1, wherein the first and second locking devices are mechanical locking devices (27, 28).

3. The locking mechanism actuating device according to claim 1, wherein the retaining device (15) for holding the piston unit (5) in the first position is activated in a default condition, and is only deactivatable to enable movement of the piston unit (5), starting from the first position equivalent to the closed condition of the locking mechanism (2), in a direction toward the second position equivalent to the open condition of the locking mechanism (2).

4. An automatic transmission vehicle drive-train locking mechanism actuating device (1), the locking mechanism actuating device comprising:
   a piston unit (5) only being spring-loaded in a closing direction of the locking mechanism (2) and hydraulically actuatable in an opening direction of the locking mechanism (2), and the piston unit (5) being displaceable in an axial direction,
   a retaining device (15) for holding the piston unit (5) either in a first axial position equivalent to an open condition of the locking mechanism (2) or in a second axial position equivalent to a closed condition of the locking mechanism (2),
   an actuating device (17), comprising an electromagnet (25) and an armature rod (19), for actuating a release element (18) of the retaining element (15),
   a displacement device (21) acting upon the release element (18) with a control force that acts in an axial direction opposite that of an actuating force of the electromagnet (25),
   when the piston unit (5) moves axially in the opening direction of the locking mechanism (2), the locking mechanism actuating device (1) activates the retaining device (15) in order to hold the piston unit (5) in the first axial position, and when the piston unit (5) moves axially in the closing direction of the locking mechanism (2), the locking mechanism actuating device (1) activates the retaining device (15) in order to hold the piston unit (5) in the second axial position,
   and the second axial position of the piston unit (5) are separated and axially spaced from one another along a surface of the retaining device (15), and the armature rod (19) and the piston unit (5) moving relative to one another as the piston unit (5) moves from the first axial position to the second axial position and vice versa.

5. The locking mechanism actuating device according to claim 1, wherein to enable movement of the piston unit (5) starting from the second axial position toward the first axial position, the retaining device (15) is deactivatable by the release element (18).

6. The locking mechanism actuating device according to claim 1, wherein the release element (18) is directly and functionally connected to an armature element (20) associated with the electromagnet (25), and the release element (18) is only indirectly connected to the piston unit (5) via a blocking element (26) of the retaining device (15).

7. The locking mechanism actuating device according to claim 4, wherein the release element (18) and the armature element (20) are directly and functionally connected to one another by an armature rod (19), and the release element (18) is only indirectly connected to the piston unit (5) via a blocking element (26) of the retaining device (15).

8. The locking mechanism actuating device according to claim 1, wherein the retaining device (15) is formed with at least one blocking element (26) which is functionally connected with the piston unit (5) in either the first or the second axial position of the piston unit (5), by which, in the activated operating condition of the retaining device (15), the piston unit (5) is held in the axial position equivalent to either the open or the closed condition of the locking mechanism (2).

9. The locking mechanism actuating device according to claim 8, wherein the at least one blocking element (26) is movable, by the release element (18), into recesses (27, 28) of either the piston unit (5) or an area functionally connected therewith so as to activate the retaining device (15).

10. The locking mechanism actuating device according to claim 9, wherein in a condition in which the at least one blocking element (26) holds the piston unit (5) in the second axial position, the at least one blocking element (26) engages a first recess (27), and in a condition in which the at least one blocking element (26) holds the piston unit (5) in the first axial position, the at least one blocking element (26) engages a second recess (28).

11. The locking mechanism actuating device according to claim 10, wherein surfaces (27A, 27B) of the release element (18) and the first recess (27), that co-operate with the at least one blocking element (26), are matched to one another such that when the electromagnet (25) is in an energized operating condition, the at least one blocking element (26) is held by the release element (18) in the first recess (27), and when the electromagnet (25) is in a de-energized operating condition, the at least one blocking element (26) is movable out of the first recess (27) by the displacement device (21), thereby allowing the hydraulic force acting on the piston unit (5) to move the piston unit (5) from the second axial position to the first axial position.

12. The locking mechanism actuating device according to claim 10, wherein surfaces (28A, 28B) of the release element (18) and the second recess (28) are matched to one another such that, when the electromagnet (25) is in an energized operating condition, the at least one blocking element (26) is held by the release element (18) in the second recess (28), and when the electromagnet (25) is in a de-energized operating condition, the at least one blocking element (26) is movable out of the second recess (28) by the displacement device (21), thereby allowing a spring force acting on the piston unit (5) to move the piston unit (5) from the first axial position to the second axial position.

13. An automatic transmission vehicle drive-train locking mechanism actuating device for a parking lock, the locking mechanism actuating device comprising:

a piston axially movable between first and second positions, the piston being connected to the parking lock such that the parking lock is closed when the piston is in the first position and the parking lock is open when the piston is in the second position, the piston being spring-loaded to move axially to the first position and hydraulically actuatable to move axially to the second position;

a retaining device being actuated, by a release element, to engage and disengage the piston, such that the retaining device, when actuated, secures the piston in the first and the second positions, and the retaining device, when disengaged deactivated, permits axial movement of the piston between the first and the second positions;

the release element communicating with an electromagnet which biases the release element, via an armature rod, such that the release element actuates the retaining device to engage the piston and thereby retain the piston in the first and the second positions;

the release element communicating with a spring which biases the release element such that the release element actuates the retaining device to disengage the piston thereby permitting axial movement of the piston between the first and the second positions;

the retaining device comprising first and second locking devices which are actuatable to either permit or prevent axial movement of the piston between the first and the second positions, and the first and the second locking devices being axially separated and spaced from one another along an inwardly facing surface of the piston;

the first locking device, when actuated to prevent axial movement, securing the piston in the first position so as to prohibit axial movement of the piston toward the second axial position caused by a faulty control of the piston;

the second locking device, when actuated to prevent axial movement, secures the piston in the second position such that the piston, in an unpressurized state, is secured in the second position; and the armature rod and the piston moving relative to one another as the piston moves from the first position to the second position and vice versa.

14. The locking mechanism actuating device according to claim 13, wherein the release element moves independently of the piston such that the release element and the piston move relative to one another as the piston moves from its closed position to its open position and vice versa.

* * * * *